(12) United States Patent
Navarra-Pruna

(10) Patent No.: US 6,589,044 B2
(45) Date of Patent: Jul. 8, 2003

(54) PLASTIC INJECTION MOLD SLIDE RETAINER

(75) Inventor: Alberto Navarra-Pruna, Sant Just Desvern (ES)

(73) Assignee: Alberto Navarra Pruna, Barcelona (ES)

( * ) Notice: Subject to any disclaimer, the term of this patent is extended or adjusted under 35 U.S.C. 154(b) by 19 days.

(21) Appl. No.: 09/863,017

(22) Filed: May 22, 2001

(65) Prior Publication Data

US 2002/0025359 A1 Feb. 28, 2002

(30) Foreign Application Priority Data

May 23, 2000 (ES) ........................................... 200001285

(51) Int. Cl.⁷ .............................................. B29C 45/66
(52) U.S. Cl. ...................................... 425/577; 425/441
(58) Field of Search ................................ 425/441, 443, 425/DIG. 58, 556, 577; 264/334

(56) References Cited

U.S. PATENT DOCUMENTS 5,234,329 A * 8/1993 Vandenberg ................ 425/577
5,257,925 A * 11/1993 Grimm ........................ 264/334
5,397,226 A * 3/1995 Vandenberg ................ 425/577
5,814,357 A * 9/1998 Boskovic ..................... 425/577
6,116,891 A * 9/2000 Starkey ....................... 425/577

* cited by examiner

Primary Examiner—Tim Heitbrink
(74) Attorney, Agent, or Firm—Bazerman & Drangel, PC

(57) ABSTRACT

Specially conceived for slides (1) which run along a track (2), having a housing (4) which is slanted in relation to the said track, a housing in which a guide (3) operates, also slanted, in a way that during the entrance of the guide, the slide (1) moves in one direction on the track (2) and on exiting it does so in the opposite direction, the retainer consists of a rod (5) which is housed in an orifice (6) of the slide perpendicular to the track (2) and which lines up with a blind orifice (10) on the track, precisely at the moment when the guide (3) exits the slide (1), the rod being aided by a spring (11) which tends to cause it to protrude constantly on the track (2) and against whose spring operates a rocker arm (14) which, also tending to enter the housing (4) of the slide, is activated by the same guide (3) when it is located in the housing of the slide.

11 Claims, 4 Drawing Sheets

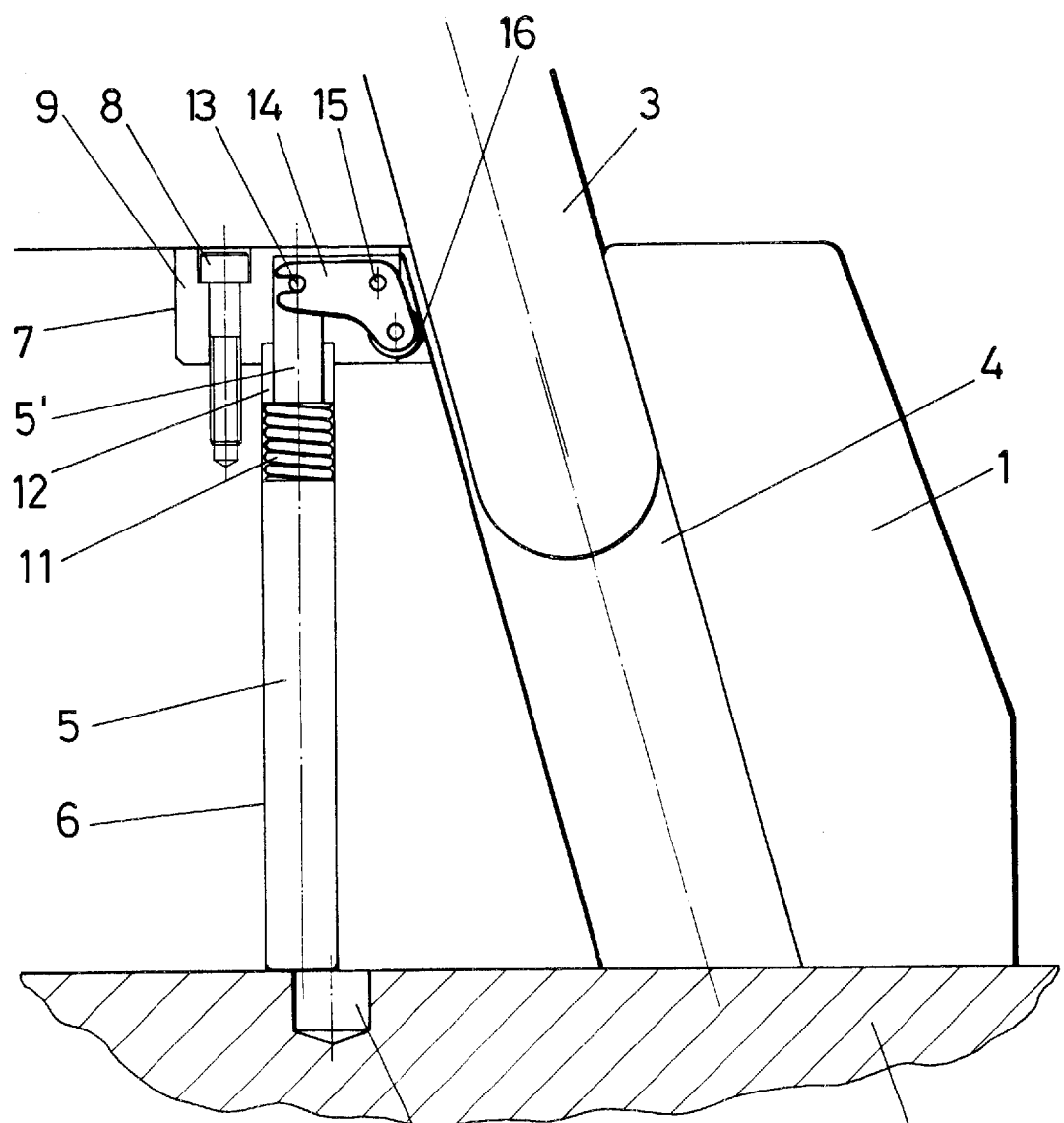
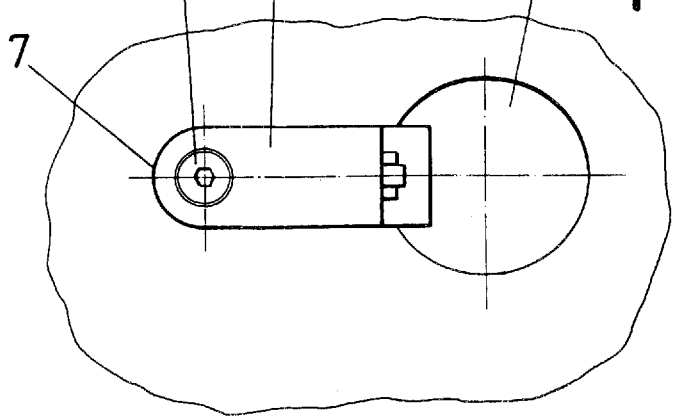

PLASTIC INJECTION MOLD SLIDE RETAINER

OBJECT OF THE INVENTION

The invention herein refers to a retainer, i.e. an element of temporary retention for a plastic injection mold slide, a retainer which appropriately positioned in the said slide, allows the connection of the same to the corresponding track, keeping it in a stable position, particularly whilst opening the mold.

The object of the invention is to achieve a retainer capable of withstanding slides of considerable weight, maintaining them completely immobile.

BACKGROUND OF THE INVENTION

As we know, in the field of injection molds the slides run along a track, the slides having holes which accommodate guides attached to the other piece of the mold, in such a way that during the maneuver of opening the said mold the aforementioned guides separate completely from the slides, which must remain in a stable position on the corresponding tracks once the guides have departed from them.

To achieve this effect, several solutions exist, such as one where the connection of the slide to the track is achieved by means of magnets, a solution which is particularly ideal when dealing with small slides, and another where retainers are used in the form of pegs which, when fixed to the slide, operate on a pivot which is duly connected to the track, causing the required retention.

In practice, these retainers take the form of a type of pincers, having two articulated arms, between which there is an open, circular housing, which operates in conjunction with the aforementioned pivot, its arms separating to allow to entrance of the pivot in the housing, bearing the pressure of the interior springs. This structurally very complex and consequently very expensive solution, implies a very significant volume, which makes it necessary to have a rather complex mechanism on the track base, to house the retainer, which also directly influences the cost of the equipment, as well as causing functional inaccuracies.

In an effort to avoid this problem, the same applicant is the holder of Utility Model U8701679, in which a retainer is described for injection mold slides and plates which takes the shape of a simple, single, flat piece of flexible material, preferably tempered steel, in which there is a small nucleus on one end, which has an orifice with a countersunk opening, in which enters a single screw to connect the aforementioned piece to the slide, a nucleus from which protrude two flexible, parallel arms which take the shape of a type of peg or clip connecting the retainer to the pivot incorporated in the track.

This solution, may only require minimal space for installing the retainer and, furthermore, allows for quick and simple installation, as with the aforementioned system in the form of pincers, it is only viable for relatively lightweight slides, of up to around 20 kg, so for heavier weights it is necessary to use several retainers superposed or adequately distributed to carry out their function.

SUMMARY OF THE INVENTION

The retainer proposed by the invention completely solves the aforementioned problem, enabling large slides to be blocked, withstanding a force of over 100 kg, i.e. five times more than conventional retainers.

In order to do this, the retainer of the proposed invention specifically uses a slide with a housing which is at an angle in relation to the direction of movement of a guide at the same angle, so that the movement of the guide in the hollow of the slide at the same time causes the movement of the slide on the corresponding track.

Thus, with this basic structure, the retainer which the invention proposes takes the form of a rod, housed in an orifice of the slide, perpendicular to the track, and with the movement of the slide, comes into line with a blind orifice drilled into the aforementioned track, this taking place specifically at the moment in which the slide is free of the guide pulling it.

The aforementioned rod has one end with a shorter diameter, the opposite end to the track, on which there is a spring which is constantly pushing the rod against the track, while its upper end has a transversal pivot which is operated by a rocker arm which is fitted in a way that it swivels on a support implanted and fixed to the slide, the rocker arm which, on the opposite end to that which operates on the aforementioned pivot, has a pulley wheel which by the effect of the aforementioned spring also tends to protrude into the interior of the slide housing and, consequently colliding with the active line of the guide, when the said guide is located inside the aforementioned housing.

In this way, while the guide is acting on the slide, the rod is retracted or inoperative, and when the guide leaves the slide support and leaves the rocker arm free, at the moment when the retaining rod is in line with the shallow orifice in the track, the spring causes the axial projection of the said rod, its entrance into the aforementioned blind orifice and the consequent stoppage of the slide.

BRIEF DESCRIPTION OF THE DRAWINGS

To complement the specification being carried out and with the aim of giving a greater understanding of the invention characteristics, in accordance with a preferred example of practical embodiment, and as an integral part of the aforementioned specification, it is accompanied by a set of illustrative and non-restrictive drawings, which represent the following:

FIG. 1 Shows a lateral view and cutaway schematic representation of part of a plastic injection mold slide, and the corresponding track, having a retainer which stops the slide which constitutes the object of the invention herein.

FIG. 2 Shows view from above with detail of the equipment represented in the previous Figure.

DETAILED DESCRIPTION OF THE INVENTION

Figure 3:
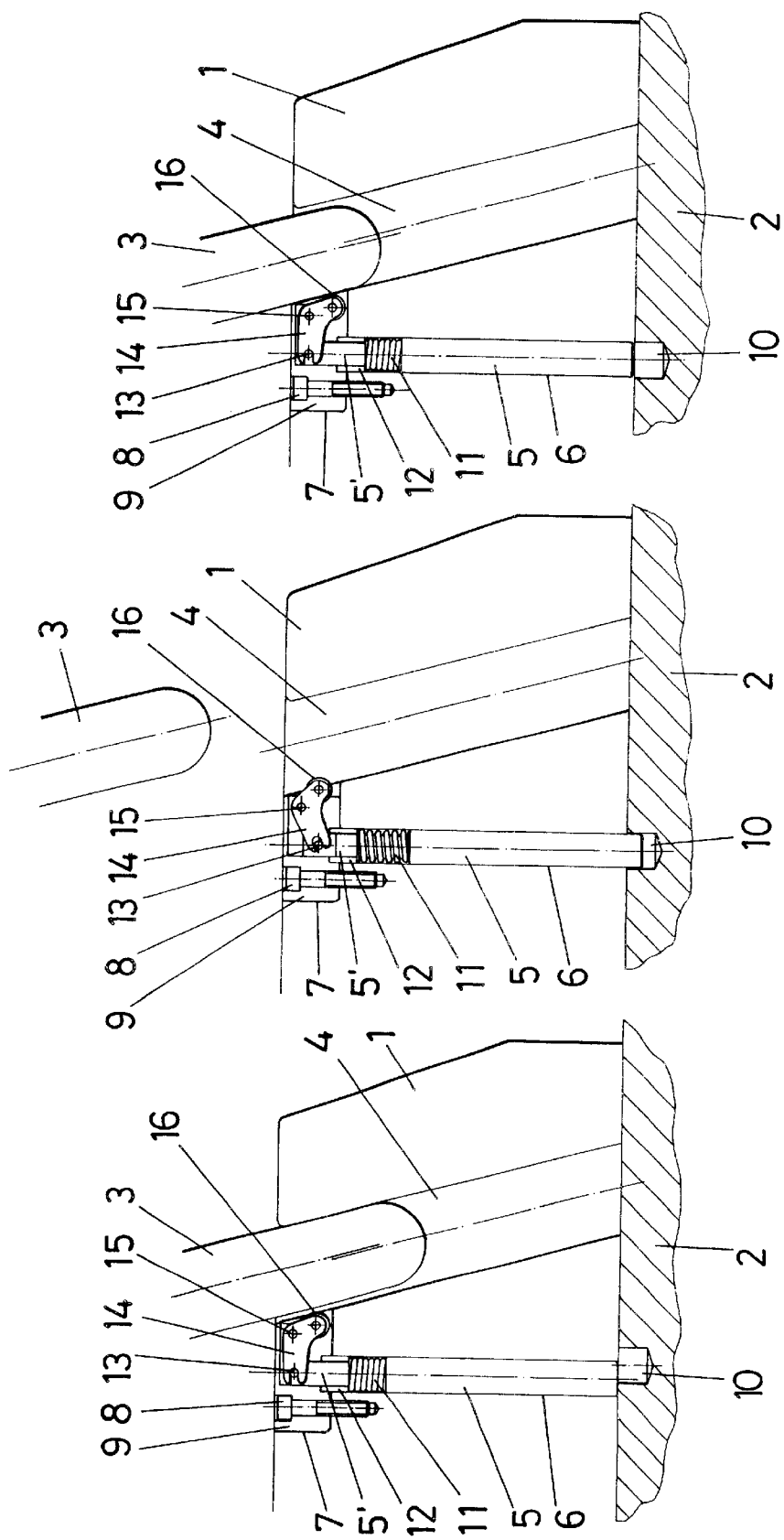
FIG. 3. Shows several sequences of the mechanism, with a representation similar to that of FIG. 1, the first one showing the slide running on the track, the second in the retained position and the third returning to the original position.

In view of the Figures described, it can be seen how the proposed retainer (1') is intended for a slide (1), which runs along a track (2), pushed by a slanted guide (3), which enters a housing (4), also at an angle, of the aforementioned slide (1), so that during the phase of the guide (3) entering the slide (1), the slide will move in a specific direction, that of the first sequence in FIG. 3, whilst when the said guide (3) moves in the opposite direction, it also pulls the slide (1) in the opposite direction, in accordance with the third sequence in FIG. 3.

So, the retainer (1') of the invention takes the shape of a rod (5), which is housed in the interior of an orifice (6) perpendicular to and opening out on to the track (2), its opposite end being enlarged (7) in which a support (9) for the said rod (5) can be coupled and secured by means of a screw (8), a rod (5) which depending on the position of the slide (1), lines up with and enters a blind orifice (10) incorporated into the track (2), precisely at the moment in which the guide (3) and the slide (1) separate, in accordance with the intermediate sequence in FIG. 3.

The rod (5) tends to constantly move against the track (2) as a result of a spring (11) fixed on the rod, (5) on the end which has a smaller diameter (5'), and which rests its other end on a bushing (12) suitably connected to the support (9), a bushing from which the aforementioned end (5') of the rod (5) protrudes to receive a transversal pivot (13) through which it is connected to a rocker arm (14), with a rocker shaft (15) located in its center and having a pulley wheel (16) which, as a result of the spring (11) tends to constantly enter the housing (4) of the slide (1) in which the guide (3) operates, the established casing for these elements being in the hollow of the aforementioned support (9), opening out onto said housing (4).

In accordance with this structuring, the mechanisms function is as follows:

When the slide (1) is in motion, the guide, indicated with an arrow in the first sequence of FIG. 3, on moving outwards from the hollow of the housing (4) of the said slide, causes the required movement of the same, maintaining the retainer (1') inoperative hence the rod (5), pushed by the spring (11) rests on the track (2) and slides along it.

In the critical moment, when the guide (3) leaves the housing (4) of the slide (1), the moment when the said slide must remain fixed and retained, the rod (5) is found to be in line with the blind orifice (10) of the track (2) and the rocker arm (14) is freed at the same time due to the absence of the guide (3), so that the rocker arm can move freely and does so as a result of the spring (11), at the same time as the rod (5), by the same result, enters into the blind orifice (10) blocking the slide (1) in relation to the track (2), as shown in the second sequence of FIG. 3.

In the maneuver of returning the slide (1), when the guide (3) enters the housing (4), it firstly collides with the pulley wheel (16) of the rocker arm (14), causing this to swivel and consequently the retraction of the rod (5), which thus leaves the blind orifice (10), unblocking the slide (1), as shown in the third sequence of FIG. 3, and ready to be pulled in the direction of the arrow in the said sequence, due to the guide (3) entering the hollow of the housing (4).

Figure 4:
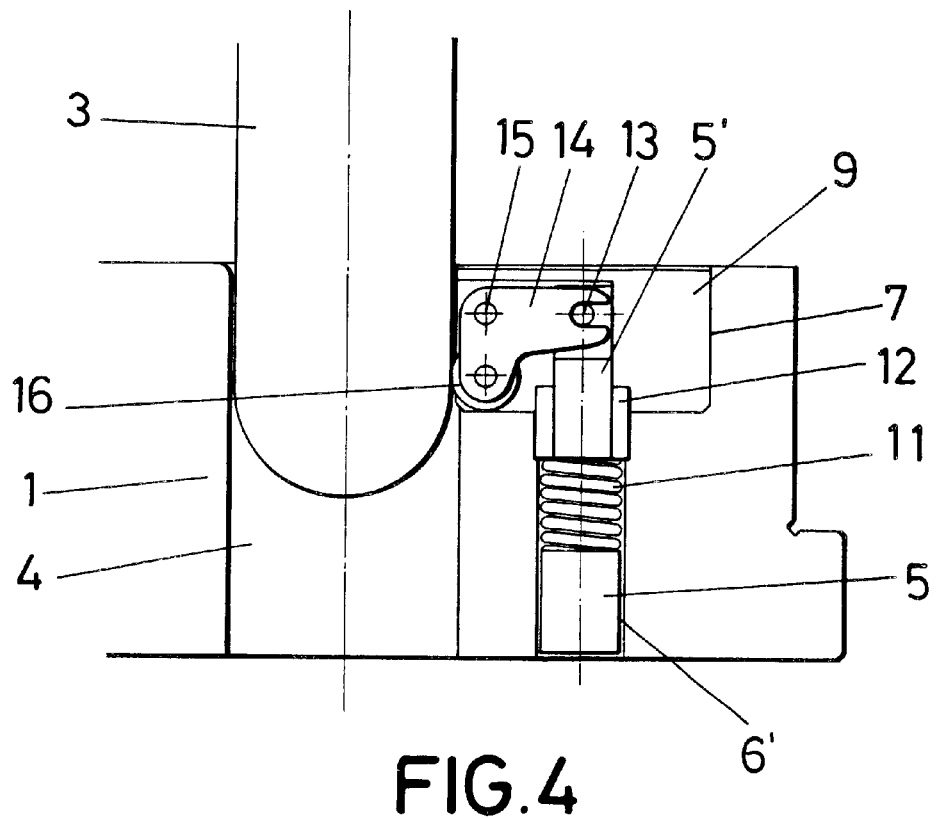
FIG. 4. Shows a similar representation to that of FIG. 1, a front view and cutaway of the equipment of the said figure, in accordance with a variant on the practical embodiment in which the means of retaining the slide on the track are positioned at a difference of 90° in relation to FIG. 1.
Figure 5:
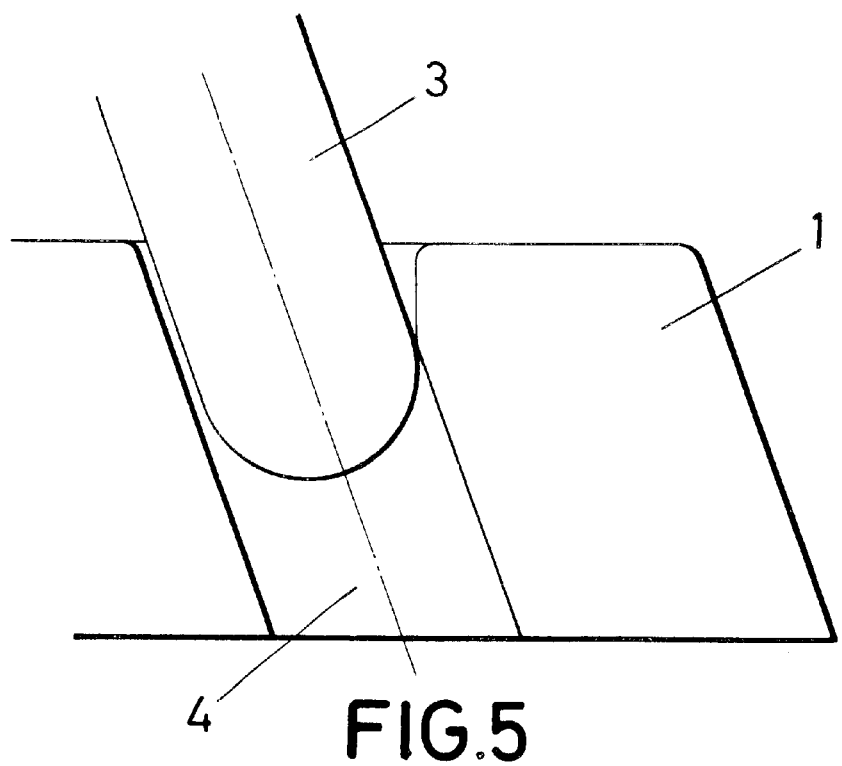
FIG. 5 Shows a lateral view of the detail represented in the previous Figure, in which we can see how the aforementioned means of retention are hidden behind the guide, being positioned perpendicularly to the imaginary path of movement of the latter.
Figure 6:
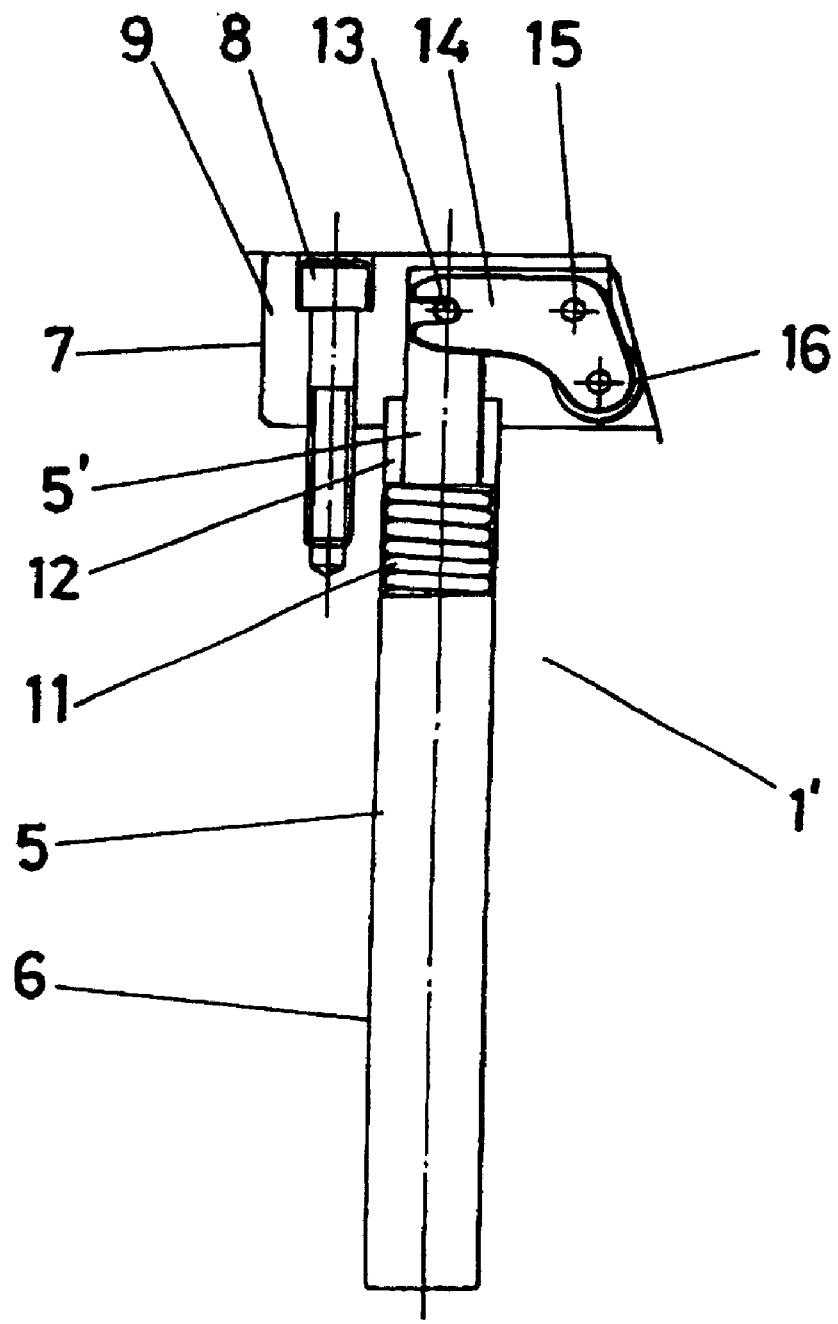
FIG. 6 Finally, shows the components of the retainer of FIG. 1.

Optionally, and with the aim of avoiding the dead center which occurs in the previous solution, it is proposed that both the rod (5) and the different related accessories adopt a lateral position in the equipment, i.e. both the orifice (6') of the slide (1) and the blind orifice of the guide, are positioned at 90° to the imaginary path on which the guide (3) moves, so that the pulley wheel (16) acting on the guide (3) works at right angles to the aforementioned path of movement of the said guide, as shown in FIGS. 4 and 5.

It is understood that the present embodiment described above is to be considered as illustrative and not restrictive. It will be obvious to those skilled in the art to make various changes, alterations and modifications to the invention described herein. To the extent that these variations, modifications and alterations depart from the scope and spirit of the appended claims, they are intended to be encompassed therein.

I claim:

1. A plastic injection mold slide retainer, which being especially applicable to a slide moving on a corresponding track with the aid of a slanted guide, said guide acting on a slide housing which is also slanted in relation to the aforementioned track comprising:

a rod, which is housed in an orifice of the slide perpendicular to the track, the rod which once freed from the slide by the linear motion of the slide lines up with a blind orifice on the track, in which said rod enters causing the blockage or retention of the slide as a result of a spring which tends to force said rod into the blind orifice, said rod aided by a rocker arm, said rocker arm activated by the guide when said guide enters the housing of the slide.

2. The retainer according to claim 1, further comprising an area of reduced diameter above said rod, causing a ridge on which the spring acts, which on one end rests a bushing connected to a fixed support implanted in the same slide and secured to it by a screw, a hollow support, opening on to the housing of the slide and having in its interior a rocker arm which protrudes onto the aforementioned slide housing.

3. The retainer according to claim 1, wherein said rocker arm is moveable by means of an intermediate shaft on the support, said rocker arm is operated by means of a first end being fixed to a transversal pivot connected to the rod, and a second end having a pulley wheel on which, in turn, the guide acts when it enters the housing of the slide.

4. The retainer according to claim 2, wherein said rocker arm is moveable by means of an intermediate shaft on the support, it is operated by means of a first end being fixed to a transversal pivot connected to the rod, and a second end having a pulley wheel on which, in turn, the guide acts when it enters the housing of the slide.

5. The retainer according to claim 1 wherein an orifice of the slide and the blind orifice of the track are positioned in a way that the rocker arm arid consequently the pulley wheel, attack the guide within its path of movement.

6. The retainer according to claim 2 wherein an orifice of the slide and the blind orifice of the truck are positioned in a way that the rocker arm and consequently the pulley wheel, attack the guide within its path of movement.

7. The retainer according to claim 3 wherein an orifice of the slide and the blind orifice of the track are positioned in a way that the rocker arm and consequently the pulley wheel, attack the guide within its path of movement.

8. The retainer according to claim 4 wherein an orifice of the slide and the blind orifice of the track are positioned in a way tat the rocker arm and consequently the pulley wheel, attack the guide within its path of movement.

9. The retainer according to claim 1 wherein an orifice of the slide and the blind orifice of the track are positioned in a way that the rocker arm and consequently the pulley wheel, attack the guide within a path perpendicular to its path of movement.

10. The retainer according to claim 2 wherein an orifice of the slide and the blind orifice of the track are positioned in a way that the rocker arm and consequently the pulley wheel, attack the guide within a path perpendicular to its path of movement.

11. The retainer according to claim 3 wherein an orifice of the slide and the blind orifice of the track are positioned in a way that the rocker arm and consequently the pulley wheel, attack the guide within a path perpendicular to its path of movement.

* * * * *